(No Model.)

J. H. FENETY.
GAGE.

No. 292,551. Patented Jan. 29, 1884.

Witnesses:
Alfred Fawcett
L. J. White

Inventor.
John H. Fenety,
per C. A. Shaw.
his Atty.

UNITED STATES PATENT OFFICE.

JOHN H. FENETY, OF BOSTON, MASSACHUSETTS.

GAGE.

SPECIFICATION forming part of Letters Patent No. 292,551, dated January 29, 1884.

Application filed October 5, 1883. (No model.)

*To all whom it may concern:*

Be it known that I, JOHN H. FENETY, of Boston, in the county of Suffolk, State of Massachusetts, have invented a certain new and useful Improvement in Gages, of which the following is a description sufficiently full, clear, and exact to enable any person skilled in the art or science to which said invention appertains to make and use the same, reference being had to the accompanying drawings, forming a part of this specification, in which—

Figure 1:
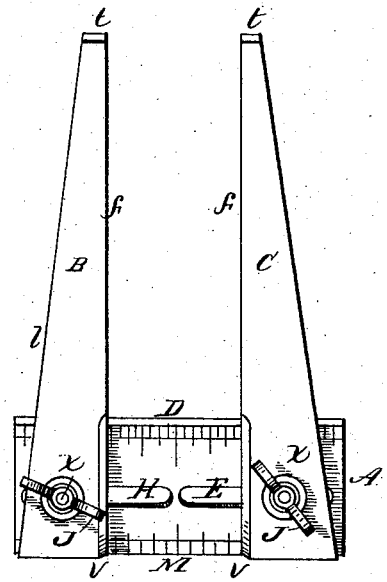
Figure 2:
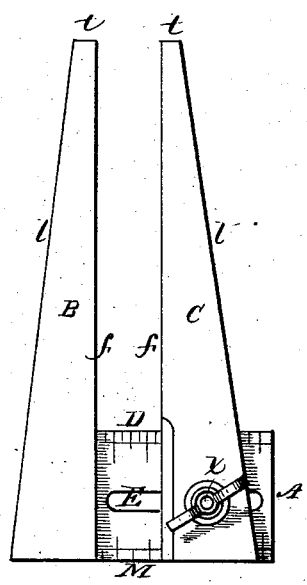
Figure 3:
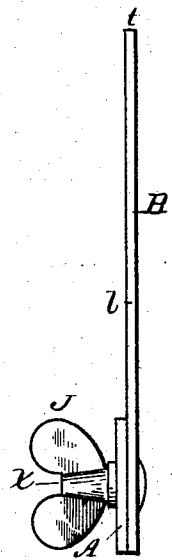

Figure 1 is a top or plan view of my improved gage; Fig. 2, a plan view of a modification of the same, and Fig. 3 an edge view or end elevation.

Like letters and figures of reference indicate corresponding parts in the different figures of the drawings.

My invention relates to that class of gages which are employed by machinists and others in constructing or testing tapering work, such as spindles, cone-pulleys, conical valve-seats, &c.; and it consists in a novel construction and arrangement of the parts, as hereinafter more fully set forth and claimed, by which a cheaper and more effective device of this character is produced than is now in ordinary use.

The nature and operation of the improvement will be readily understood by all conversant with such matters from the following explanation, its extreme simplicity rendering an elaborate description unnecessary.

In the drawings, A represents the body, and B C the arms, of the gage. The body, which is one inch in width, is provided on its inner edge with the scale D, on its outer edge with the scale M, and also at its center with two elongated slots, E H. A headed screw-bolt, $x$, passes through the slot E, and through a hole in the arm C, and is provided with a nut, J, for attaching the arm to the body A and securing it in any desired position thereon, the arm B being secured and rendered adjustable in substantially the same manner. The scales are divided into inches and parts of inches, the smallest division representing one forty-eighth part of an inch. The arms are four inches in length, and are straight on their inner edges, $f$, and tapering or inclined on their outer edges, $l$.

In the use of my improvement the arm C is set by having the lower end, $v$, of its edge $f$ placed in any desired position on the scale M, its upper end being moved outwardly, for instance, one point, or one forty-eighth part of an inch, on the scale D, the point $v$ being the center of motion, around which the arm passes through the arc of a circle when moved, as described. The arm B is then adjusted in the same manner as the arm C, the points $v\ v$ being placed at a greater or less distance than one inch apart, in accordance with the size of the taper to be tested or the work being done.

As the body A is one inch in width and the arms four inches in length, it will be obvious that when the arm C is moved outwardly to indicate one forty-eighth part of an inch on the scale D the end $t$ of said arm will have been moved four times that distance, or four forty-eighths of an inch; also, that when the arm B is moved outwardly in a corresponding manner an equal distance, and both arms secured, the inner edges, $f\ f$, of the arms will stand eight forty-eighths, or one-sixth, of an inch farther apart at the ends $t\ t$ than they do at the ends $v\ v$, and that the gage will be set for a taper of one-sixth of an inch to every four inches.

In Fig. 2 the arm B is rigidly attached at right angles to one end of the body A, this form of construction answering for ordinary purposes. I, however, deem it preferable to construct the gage with both arms adjustable, as shown in Fig. 1, thereby rendering it adapted for testing tapering holes, conical valves, valve-seats, &c., as well as for ordinary work.

The outer edges, $l$, or the inner edges, $f$, may be used as required, and the arms may be adjusted at any desired angle; but as its capabilities, and also the uses to which the gage may be put, will readily suggest themselves to all mechanics, a more explicit description is deemed unnecessary.

I do not confine myself to constructing the body A or arms B C of any special length or width, or to dividing the scales M D as described, as these features may be varied considerably without departing from the spirit of my improvement.

Having thus explained my invention, what I claim is—

1. The combination of a slotted plate or body having graduated scales at its upper and lower edges, two arms, both attached at their inner ends to said plate and relatively adjustable at different inclines to each other, their edges passing both scales, said arms being free and disconnected at their outer ends, whereby they are adapted to enter a tapered tube or recess or to receive a tapered body between them, and means for adjusting or fastening said arms on said plate, the width of the plate and the length of the arms being of certain relative proportions, substantially as described.

2. The combination of a slotted plate or body provided with an arm and with two graduated scales at its upper and lower edges, and a second arm, also attached to said plate and adjustable at an incline to the first arm, its inner edge passing both scales, the outer ends of said arms being disconnected and adapted to receive a tapered spindle lengthwise between them, substantially as described.

JOHN H. FENETY.

Witnesses:
C. A. SHAW,
L. J. WHITE.